US012685310B2

(12) United States Patent
Chauffour et al.

(10) Patent No.: US 12,685,310 B2
(45) Date of Patent: Jul. 21, 2026

(54) KIT FOR THE TREATMENT OF SEEDS

(71) Applicants: INSTITUT NATIONAL DE RECHERCHE POUR L'AGRICULTURE, L'ALIMENTATION ET L'ENVIRONNEMENT, Paris (FR); INSTITUT DES SCIENCES ET INDUSTRIES DU VIVANT ET DE L'ENVIRONNEMENT, Paris (FR)

(72) Inventors: Frédéric Chauffour, Poissy (FR); Omae Pozza, Meudon (FR); Boris Collet, Issy les Moulineaux (FR); Julie Auclair, Verneuil sur Seine (FR); Loïc Rajjou, Montigny le Bretonneux (FR)

(73) Assignees: INSTITUT NATIONAL DE RECHERCHE POUR L'AGRIULTURE, L'ALIMENTATION ET L'ENVIRONMENT, Paris (FR); INSTITUT DES SCIENCES ET INDUSTRIES DU VIVANT ET DE L'ENVIRONNMENT, Paris (FR)

( * ) Notice: Subject to any disclaimer, the term of this patent is extended or adjusted under 35 U.S.C. 154(b) by 496 days.

(21) Appl. No.: 18/019,508

(22) PCT Filed: Aug. 6, 2021

(86) PCT No.: PCT/FR2021/051451
§ 371 (c)(1),
(2) Date: Feb. 3, 2023

(87) PCT Pub. No.: WO2022/029394
PCT Pub. Date: Feb. 10, 2022

(65) Prior Publication Data
US 2023/0284615 A1 Sep. 14, 2023

(30) Foreign Application Priority Data
Aug. 6, 2020 (FR) ..................................... 2008326

(51) Int. Cl.
| | |
|---|---|
| *A01N 37/40* | (2006.01) |
| *A01C 1/02* | (2006.01) |
| *A01N 37/46* | (2006.01) |
| *A01N 43/08* | (2006.01) |
| *A01N 43/12* | (2006.01) |
| *A01N 43/16* | (2006.01) |
| *A01N 43/36* | (2006.01) |
| *A01N 43/82* | (2006.01) |
| *A01N 59/24* | (2006.01) |

(52) U.S. Cl.
CPC ................ *A01N 37/40* (2013.01); *A01C 1/02* (2013.01); *A01N 37/46* (2013.01); *A01N 43/08* (2013.01); *A01N 43/12* (2013.01); *A01N 43/16* (2013.01); *A01N 43/36* (2013.01); *A01N 43/82* (2013.01); *A01N 59/24* (2013.01)

(58) Field of Classification Search
CPC ........ A01N 43/12; A01N 37/46; A01N 43/08; A01N 43/36; A01N 59/24
See application file for complete search history.

(56) References Cited

U.S. PATENT DOCUMENTS

| | | | |
|---|---|---|---|
| 2010/0126065 A1 | 5/2010 | Nishimura et al. |
| 2013/0047505 A1 | 2/2013 | Ng |

FOREIGN PATENT DOCUMENTS

| | | | | |
|---|---|---|---|---|
| CN | 105075453 A | 11/2015 | | |
| JP | 2006211943 A | 8/2006 | | |
| WO | WO-2018215783 A1 * | 11/2018 | ............. | A01N 45/00 |
| WO | 2019030442 A1 | 2/2019 | | |

OTHER PUBLICATIONS

International search Report for corresponding application PCT/FR2021/051451 filed Aug. 6, 2021; Mail date Nov. 23, 2021.

Muhammad Farooq, "Seed priming in field crops: potential benefits, adoption and challenges", Crop & Pasture Science, 2019, 70, 731-771.

Japanese Office Action for Application No. 2023-507975, dated Nov. 25, 2025, 6 pages with translation.

* cited by examiner

*Primary Examiner* — John Pak

(74) *Attorney, Agent, or Firm* — Oliff PLC

(57) ABSTRACT

A kit for preparing an imbibition medium in a treatment for priming seeds, including and configured for a combined application of at least two different agents, the agents being chosen from: a) one or more activators of germination of the seeds, the concentration of the or each of the activators in the imbibition medium being 0.01-10 mM, b) one or more agents capable of providing protection to the seeds and/or the plants resulting therefrom, the concentration in the imbibition medium of the or each of the agents being 0.01-10 mM, and c) one or more regulators of the cellular oxidative mechanisms of the seeds.

16 Claims, 4 Drawing Sheets

[FIG. 1]
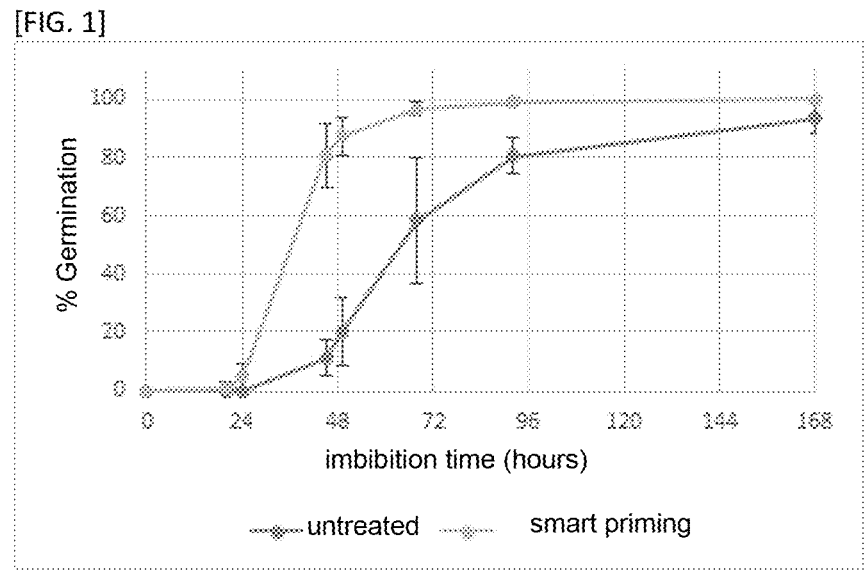
[FIG. 2]
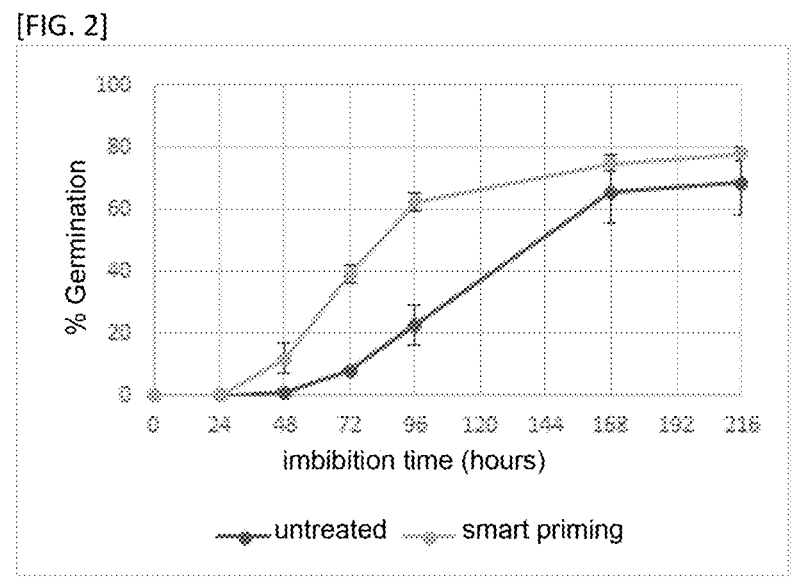

[FIG. 3]
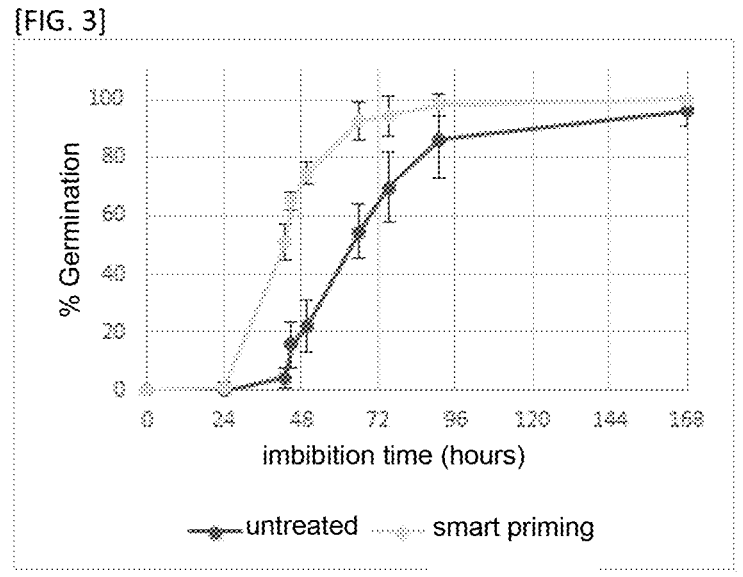
[FIG. 4]
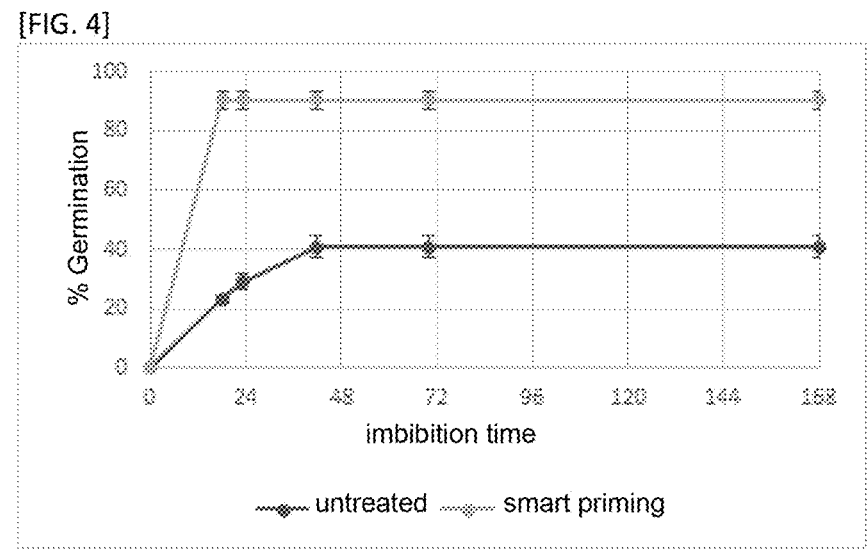

[FIG. 5]
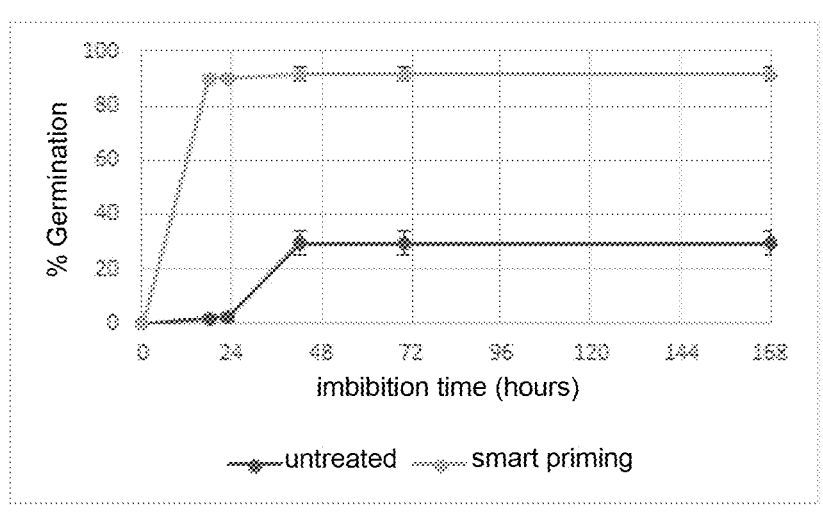
[FIG. 6]
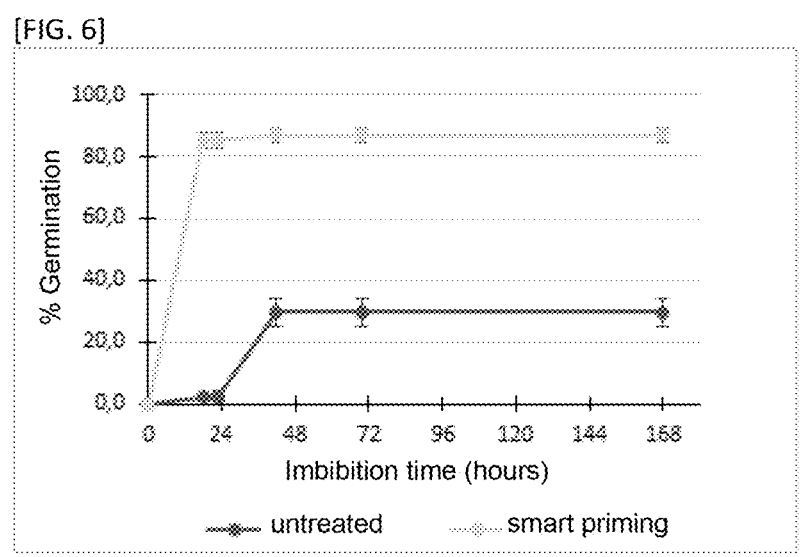

[FIG. 7]
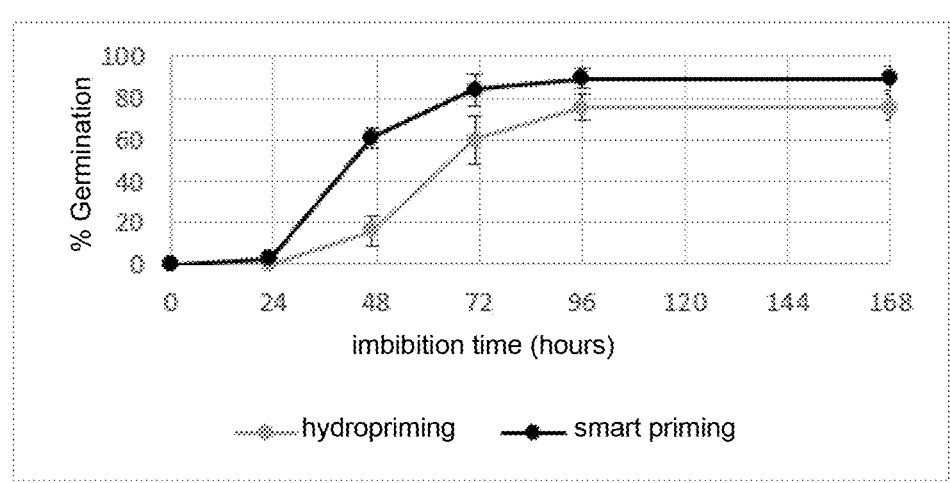
[FIG.8]
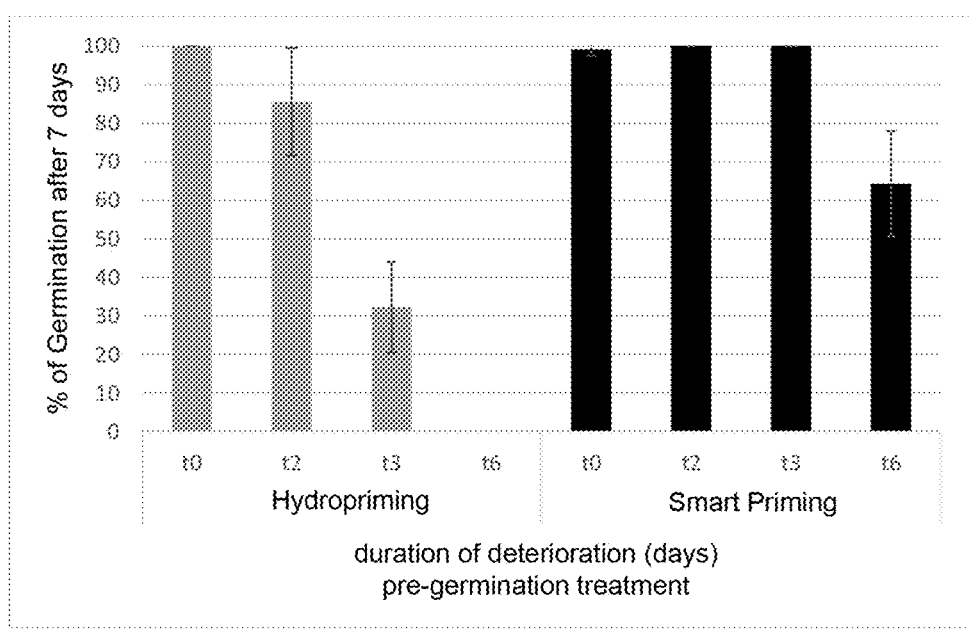

KIT FOR THE TREATMENT OF SEEDS

TECHNICAL FIELD

The disclosure concerns a treatment of seeds, and more specifically a combination of active ingredients for treating seeds before their germination, with a view to conferring on them, as well as on the plants which will result therefrom, improved properties.

BACKGROUND

The treatments of the seeds after their harvest and before the initiation of the germination process, called pre-germination treatment, have proven to be effective in improving the germination performance, in particular for seeds to be optimized with a view to their subsequent use or for seeds with germination defects. Among the pre-germination treatments, a priming treatment or seed priming is known, which generally consists in imbibing dry seeds, or grains, in a controlled manner, in order to prime the preliminary phase of germination, then in drying the grains, this dehydration resulting in the blocking of the development process, and this, just before the exit of the radicle which characterizes the germination. The grains are then marketed, this phase involving the storage of the grains thus treated under very variable conditions, and their germination may resume its cycle as soon as they are sown and rehydrated.

The known priming methods make it possible to significantly increase the speed of germination, to improve the homogeneity of emergence of the young plantlets after sowing the grains thus treated and to increase the tolerance of the plants to abiotic stresses, such as climatic hazards. Although inducing a significant increase in the germinative energy, which is particularly beneficial in market gardening sectors, they do not allow to stimulate the mechanisms of resistance of the plants to biotic stresses. In addition, the priming has the disadvantage of significantly affecting the lifespan of the seeds thus treated, preventing seed batches from being carried over from one year to the next.

The document M. Farooq et al. Crop & Pasture Science, 2019, 70, 731-771 is a review of the various known primings. These comprise at least the act of imbibing grains to trigger the metabolic mechanisms involved in the pre-germination, then, before the germination that is to say before the breakthrough of the radicle, the drying of the grains thus activated. Even if the only treatment consisting in imbibing the grains in water and then dehydrating them, also called hydropriming, has a certain effectiveness on the germination, the nature of the medium in which the grains are moistened is the field of most of the studies carried out on this subject with a view to increasing the efficiency of such treatment. Thus, this medium may be supplemented with various active ingredients to apply chemical, osmotic, hormonal or other type ingredients to the grains. These ingredients are chosen without limitation from the germination activators, in particular nitrate and phosphate salts; osmotic agents such as polyethylene glycol, salts such as sodium and potassium chlorides, polyols; growth regulators; growth hormones; hormonal regulators. The imbibition medium may also be exposed to physical treatments such as ultraviolet radiation, gamma radiation or even plasma treatments. If they effectively make it possible to accelerate the germination of the grains after sowing compared to untreated grains and to influence the physiological properties of adaptation of the plants resulting from these grains with regard to abiotic stresses, these primings have no or very little favorable impact on the resistance of the plants to biotic stresses; they also have an unfavorable effect on the lifespan of the grains. This is an important parameter, a loss of energy and viability of the seeds during their storage can lead to the loss of considerable volumes of seeds for marketing.

BRIEF SUMMARY

The present disclosure provides a solution combining the advantages of the priming methods of the prior art and the resolution of the problems encountered with the known methods.

It has been discovered that a combination of at least two active ingredients acting respectively on determined mechanisms in the development of the plant from its birth in the grain state to its maximum growth, administered to seeds within the context of a priming treatment makes it possible to meet the above requirements.

Thus, the disclosure provides a kit for preparing an imbibition medium for a treatment for priming seeds, said kit comprising and being configured for a combined application of at least two different agents, said agents being chosen from:

a) one or more activators of germination of said seeds, the concentration of the or each of said activators in the imbibition medium being 0.001-10 mM, b) one or more agents capable of providing protection to said seeds and/or the plants resulting therefrom, the concentration in the imbibition medium of the or each of said agents being 0.01-10 mM, and c) one or more regulators of the cellular oxidative mechanisms of said seeds.

Before exposing the disclosure in more detail and presenting its variants, the definition of certain terms used in the present text is given below.

In the present text, the terms "seed" and "grain" are used to define the stage of development of the plant before germination but also covering the beginnings of the germination, and the term "plant" is used to define any stage of development of a plant commencing with the rupture of the seed coats and the elongation of the radicle.

By priming treatment, we understand according to the disclosure a treatment which acts on the embryo, the albumen and/or on the envelope(s), directly or indirectly, this action being able to have an effect on the plantlet and/or the plant that results therefrom. Such an action makes it possible to control the physiology of the embryo to promote its growth during the germination and post-germinative phases, to weaken the seed coats, to increase the adaptation of the seed and/or that of the plant to unfavorable physical, chemical and/or biological conditions, such as biotic stress like an aggression by pathogenic organisms, or abiotic stress like an osmotic stress or a thermal stress. This treatment comprises at least one step of imbibing the grains and one step of drying said grains thus treated.

This treatment may be carried out by any technique as long as it exerts a, direct or indirect, effect on the embryo, the albumen and/or on the envelope(s). The imbibition of the seeds may be performed by soaking in a solution for a determined period and environment, or by any other appropriate imbibition technique, the seeds thus imbibed being then dried.

Such a definition thus excludes a surface treatment of the seeds by coating or film-coating with a protective agent, this type of treatment not acting on the embryo, nor on the albumen and the envelopes.

By germination activator or agent a) according to the present disclosure is meant an agent which will trigger and/or stimulate the germination conditions of a batch of seeds which, in the absence of such an activator, would have germinated less and/or germinated less quickly and heterogeneously; thus, it may act by direct or indirect signaling by promoting the synthesis of the molecules necessary for germination and/or promoting the catabolism of molecules that inhibit the germination By agent capable of providing protection to said seeds and/or the plants resulting therefrom or agent b) according to the disclosure, is meant an agent which will trigger and/or stimulate the natural defenses of the seeds and of the young plants which, in the absence of such an agent, would not have been activated or less activated; thus, it may promote the adaptation of the seeds or of the plants to a wide spectrum of pathogens or pests.

By regulator of the cellular oxidative mechanisms of said seeds or agent c) according to the disclosure, is meant an agent which will trigger and/or stimulate the mechanisms of cellular detoxification of the seeds or of the young plants which, in the absence of such a regulator, would not have been activated or less activated; thus, it may promote the conservation of the treated seeds and/or the germination of the seeds under unfavorable environmental conditions for the species. The disclosure is described below in detail and its implementation variants exposed.

Within each group of agents, respectively a), b) and c) above, the representative molecules may be of different chemical natures, their function as defined above possibly resulting from different biological mechanisms. However, it is important to specify that these functions are known to those skilled in the art and that by using their general knowledge, they are able to choose one or more molecules as agents a), b) and c), respectively. Molecules representative of each of these agents are given in the description, it being understood that the disclosure is not restricted thereto. It is indeed the combination of such agents according to the disclosure which may lead, in addition to the benefits of the priming, to an improvement in the physiological properties of adaptation of the plants resulting from these grains or of the grains themselves.

The drying step within the context of a treatment according to the disclosure may be carried out by any means allowing the treated grain to substantially return to the same state of dehydration as before the treatment. Thus, it may be performed in the absence or under a stream of air or another inert gas, at room temperature or at a temperature compatible with the grain, that is to say not affecting its properties. It is part of the general knowledge of those skilled in the art to determine, depending on the type of seed, the drying conditions, as well as to measure the water or humidity content of a seed, for example by means of a moisture meter.

By kit according to the disclosure, it is understood that the agents a), b) and/or c) are each placed in solid or flexible containers, for example of the ampoule or pouch type. They are in a liquid or solid form, directly usable in a treatment according to the disclosure or requiring dilution or solubilization. The latter is carried out in any solvent compatible with the imbibition of the seeds, water being preferred.

As said above, a kit of the disclosure comprises at least two different agents chosen respectively from:

a) one or more activators of germination of said seeds, the concentration of the or each of said activators in the imbibition medium being 0.001-10 mM, b) one or more agents capable of providing protection to said seeds and/or the plants resulting therefrom, the concentration of the or each of said agents in the imbibition medium being 0.1-10 mM, and c) one or more regulators of the cellular oxidative mechanisms of said seeds.

A kit of the disclosure is in particular dedicated to the treatment of seeds intended to be stored before being sown.

In one aspect, it comprises:

a) one or more activators of germination of said seeds, the concentration of the or each of said activators in the imbibition medium being 0.01-10 mM, and at least one of the following two agents b) and c):

b) one or more agents capable of providing protection to said seeds and/or the plants resulting therefrom, the concentration of the or each of said agents in the imbibition medium being 0.1-10 mM, c) one or more regulators of the cellular oxidative mechanisms of said seeds.

In another aspect, it comprises three different agents chosen respectively from the germination activators a) in a concentration as indicated above, the agents b) in a concentration as indicated above, and the regulators c).

The germination activator(s) a) may be chosen from dormancy inhibitors. In particular, they may be activators of the catabolism of the abscisic acid and/or activators of hormones such as gibberellins. Thus, a germination activator a) may be chosen from stimulators, precursors and donors of the production of nitric oxide, such as arginine, citrulline, sodium nitroprusside (SNP) and S-nitrosoglutathione (GSNO), as well as mixtures thereof.

Advantageously, a kit of the disclosure comprises one or more germination activators a) chosen from nitrates, nitrites, arginine, citrulline, sodium nitroprusside (SNP), S-nitrosoglutathione (GSNO), phosphates, sulfates, ethylene, precursors of ethylene, ammonium salts, allantoin, as well as mixtures thereof. Nitrates, nitrites, phosphates and sulfates, and any mixture thereof, may each be present in a concentration in the imbibition medium of 0.1 to 10 mM, alone or in combination.

According to one mode of the disclosure, the agent(s) a) is/are chosen from potassium nitrate at a concentration in the imbibition medium of 0.1-10 mM, calcium nitrate at a concentration in the imbibition medium of 0.1-10 mM, magnesium sulfate at a concentration in the imbibition medium of 0.1-10 mM, monobasic potassium phosphate at a concentration in the imbibition medium of 0.1-10 mM, potassium hydrogen phosphate at a concentration in the imbibition medium of 0.1-10 mM, gibberellic acid at a concentration in the imbibition medium of 0.01-1 mM and sodium nitroprusside at a concentration in the imbibition medium of 0.01-1 mM.

The agent(s) capable of providing protection to said seeds and/or the plants resulting therefrom b) may be chosen from the stimulators of the natural defenses of the seeds and the stimulators of the natural defenses of the plants resulting from said seeds, in response to a biotic stress and/or an abiotic stress.

Preferred agents b) are selected from molecules of the salicylate family, such as salicylic acid, at a concentration in the imbibition medium of 0.05-3 mM, the derivatives of the salicylic acid, in particular esters, and acibenzolar-S-methyl. The preferred derivatives of salicylic acid are sulfosalicylic acid and methyl salicylate when present in the imbibition medium at a concentration of 0.1-5 mM.

The regulator(s) of the cellular oxidative mechanisms c) may be chosen from osmoprotectors and antioxidants. Preferred the osmoprotectors are chosen from proline present in a concentration in the imbibition medium of 0.1-30 mM, trehalose, aminobutyric acid, reducing sugars, as well as mixtures thereof. Preferred antioxidants are chosen from ascorbic acid and its salts, such as its alkali metal and alkaline earth metal salts, in a concentration in the imbibition medium of 0.05-150 mM, reduced glutathione in a concentration in the imbibition medium of 0.01-5 mM, tocopherols in a concentration in the imbibition medium of 0.05-30 mM and tocopherol acetate in a concentration in the imbibition medium of 0.05-30 mM.

The disclosure further concerns a method for treatment of seeds comprising the following steps:
  the seeds are imbibed in an imbibition medium obtainable
    from a kit as defined above and in particular in any of
    its variants, until saturation, then
  the seeds thus imbibed are dehydrated.

The imbibition phase corresponds to an absorption of the imbibition medium by the seed. The amount of water or medium that a grain must absorb during this imbibition phase is a concept well known to those skilled in the art and depends on the seed. Generally, it is preferred that the grain absorbs at least 75% by weight of the amount of water or imbibition medium required by the grain to enter the germination phase (Phase II of the germination process).

The disclosure also relates to the use of a kit as defined above, to carry out a treatment for priming seeds. These are generally intended to be stored before being sown, but of course, they may be used directly after a priming treatment according to the disclosure. This comprises at least one step of imbibition of the seeds with at least one aqueous solution of the agents a), b) and/or c) defined in the kit and is followed by a drying or dehydration step. This imbibition may be carried out by any means and in particular by impregnation or spraying with one or more liquid solutions of said agents a), b) and/or c). At the end of the drying, we obtain dried grains having undergone a priming treatment which may be stored for several months, and which have remarkable germination properties.

One of the advantages of a kit of the disclosure also lies in the fact that it is effective on most seeds and in particular the seeds of cultivated or cultivable plant species. Thus, vegetable seeds, aromatic seeds, floral seeds and field seeds may be treated with the prospect of activating the germination but also of strengthening the unborn plant, in particular with regard to the biotic and abiotic stresses.

BRIEF DESCRIPTION OF THE DRAWINGS

The various aspects of the disclosure are illustrated in the following examples from which its advantages and benefits will emerge, with the support of the appended figures according to which:

FIG. 1 represents a comparison of the germination kinetics of tomato seeds untreated and treated according to the disclosure in Example 1.

FIG. 2 represents a comparison of the germination kinetics of mint seeds untreated and treated according to the disclosure in Example 2.

FIG. 3 represents a comparison of the germination kinetics of tomato seeds untreated and treated according to the disclosure in Example 3.

FIG. 4 represents a comparison of the germination kinetics of lettuce seeds untreated and treated according to a treatment outside the disclosure illustrated in Example 4, for comparison purposes.

FIG. 5 represents a comparison of the germination kinetics of lettuce seeds untreated and treated according to the disclosure in Example 5.

FIG. 6 represents a comparison of the germination kinetics of lettuce seeds untreated and treated according to the disclosure in Example 6.

FIG. 7 represents a comparison of the germination kinetics of tomato seeds treated according to the disclosure in Example 7 and treated by a treatment outside the disclosure (hydro-priming) for comparison purposes, after 18 months of storage.

FIG. 8 represents a comparison of the germinative capacity of seeds 7 days after the germination of lettuce grains treated according to the disclosure in Example 8 and treated by a treatment outside the disclosure (hydro-priming) for comparison purposes, after a controlled deterioration treatment.

DESCRIPTION AND EXAMPLES

In these examples, the abbreviations used are defined below:
  GSH: reduced glutathione
  ASA: ascorbic acid
  GA4: gibberellin
  Pro: proline
  $KNO_3$: potassium nitrate
  $Ca(NO_3)_2$: calcium nitrate
  $MgSO_4$: magnesium sulphate
  $NH_4SO_4$: ammonium sulphate
  $KH_2PO_4$: monobasic potassium phosphate
  $K_2HPO_4$: potassium hydrogen phosphate
  SA: salicylic acid
  SNP: sodium nitroprusside Each example 1-6 illustrates the implementation of a kit according to the disclosure in a treatment for priming grains comprising imbibition and drying, then the germination of the grains thus treated, and the comparison with grains not treated.

Example 7 illustrates the implementation of a kit according to the disclosure in a treatment for priming grains comprising imbibition and drying, their storing for a period of 18 months and then germinating the grains thus treated, and comparing with grains treated by hydro-priming (outside the disclosure) in an imbibition medium consisting only of water and having undergone the same storage conditions.

Example 8 illustrates the implementation of a kit according to the disclosure in a treatment for priming grains comprising imbibition and drying, their controlled deteriorating to assess their storage performance and then germinating the grains thus treated, and comparing with grains treated by hydro-priming (outside the disclosure) in an imbibition medium consisting only of water and having undergone the same controlled deterioration conditions.

The protocol of the general treatment followed in the examples consists in preparing the imbibition medium by solubilizing the agents a), b) and/or c) of a kit of the disclosure in water and allowing the grains to be permeated therein for a period of 4 h to 336 h at temperatures between 4 and 50° C.

The grains are then dried under a constant stream of air for a period of 2 h to 96 h in temperatures between 4 and 50° C. and a relative humidity between 15% and 90%.

The protocol of germination of the grains, whether treated or not, is the same for all the examples. 100 grains are germinated on an AnchorBlue type filter paper (10×16 cm) imbibed to saturation with reverse osmosis water. The germination tests are conducted for each condition with 4 replicates, representing at least 400 grains tested per condition. The germination rate is determined by the ratio of the number of germinated grains to the number of total grains.

The different steps of the protocol followed are detailed below.

Imbibition or Wetting Dry Seeds:

This step is carried out with an aqueous solution comprising at least two of the agents a), b) and c) as specified in each of the examples.

The duration of the treatment is greater than 4 h; for tomatoes, it is generally 104 h.

The temperature is maintained between 2° C. and 40° C.

Drying Seeds:

After imbibition in the aqueous solution, the seeds are rinsed with water and then dried under a stream of air at room temperature for 3 days.

The seeds thus dried are stored, before/after treatment, at a temperature lower than 10° C.

The protocol for controlled deterioration of grains treated according to a method of the disclosure or treated by hydro-priming is composed of three phases and is carried out on re-dried treated grains. The first phase, called the balancing phase, consists in putting the dry treated grains at a temperature of 20° C. and a relative humidity of 76% for 3 days. The second phase, called the deterioration phase, consists in transferring the grains that have undergone the first phase at a temperature of 40° C. and a relative humidity of 76% for 0, 2, 3 or 6 days. The third phase, called the rebalancing phase, consists in transferring the grains that have undergone the second phase at a temperature of 20° C. and a relative humidity of 32% for 3 days. The resulting grains are stored at a temperature of 10° C. and then germinated. The grains annotated "t0" correspond to grains that have only undergone the balancing and rebalancing phase of the controlled deterioration protocol. The grains annotated "t2", "t3" and "t6" correspond to grains having undergone respectively 2, 3 and 6 days of deterioration phase.

Example 1: Use of a Kit According to the Disclosure for a Treatment for Priming Tomato Grains, Comprising Agents a) and c)

The imbibition medium is an aqueous solution of the following germination activating agents a) 0.5-5 mM $KNO_3$+0.1-5 mM $MgSO_4$+0.1-5 mM $NH_4SO_4$+0.1-5 mM $KH_2PO_4$, and of the following cellular oxidative metabolism regulating agents c) 1-50 mM ASA+1-5 mM GSH+1-20 mM Pro.

The thus pretreated grains and untreated grains are germinated according to the protocol described above carried out at 25° C. in continuous light. The germination kinetics of tomato seeds untreated (black) and treated according to the disclosure (grey) are represented in FIG. 1.

Example 2: Use of a Kit According to the Disclosure for a Treatment for Priming Mint Seeds, Comprising Agents a) and c)

The imbibition medium is a solution of the following germination activating agents a) 0.5-5 mM $KNO_3$+0.1-5 mM $MgSO_4$+0.1-5 mM $NH_4SO_4$+0.1-5 mM $KH_2PO_4$+0.05-0.5 mM GA4+0.05-0.5 mM SNP, and of the following cellular oxidative metabolism regulator, 1-20 mM Pro.

The thus pretreated grains and untreated grains are germinated according to the protocol described above carried out at 25° C. in the dark.

The germination kinetics of spearmint seeds untreated (black) and treated according to the disclosure (grey) are represented in FIG. 2.

Example 3: Use of a Kit According to the Disclosure for a Treatment for Priming Tomato Grains, Comprising Agents a), b) and c)

The imbibition medium is a solution of the following germination activating agents a) 0.5-5 mM $KNO_3$+0.1-5 mM $MgSO_4$+0.1-5 mM $NH_4SO_4$+0.1-5 mM $KH_2PO_4$, of the following agent capable of providing protection to the seeds or the plants resulting therefrom b) 0.1-5 mM SA, and of the following cellular oxidative metabolism regulators c) 1-50 mM ASA+1-5 mM GSH+1-20 mM Pro.

The germination kinetics of tomato seeds untreated (black) and treated according to the disclosure (grey) are represented in FIG. 3.

Example 4: Use of a Kit for a Treatment for Priming Lettuce Grains, Comprising Agents a)

This example does not illustrate the disclosure, Examples 5 and 6 are mentioned for comparison purposes, highlighting the fact that the agents b) and c) have no antagonistic effects on the action of the agents a).

The imbibition medium is an aqueous solution of the following germination activators a) 0.5-5 mM $KNO_3$+0.1-5 mM $MgSO_4$+0.1-5 mM $NH_4SO_4$+0.1-5 mM $KH_2PO_4$.

The germination kinetics of lettuce seeds untreated (black) and treated according to the disclosure (grey) are represented in FIG. 4.

Example 5: Use of a Kit According to the Disclosure for a Treatment for Priming Lettuce Grains, Comprising Agents a) and b)

The imbibition medium is an aqueous solution of the following germination activators a) 0.5-5 mM $KNO_3$+0.1-5 mM $MgSO_4$+0.1-5 mM $NH_4SO_4$+0.1-5 mM $KH_2PO_4$, and of the agent capable of providing protection to the seeds or the plants resulting therefrom b), 0.1-5 mM SA.

The germination kinetics of lettuce seeds untreated (black) and treated according to the disclosure (grey) are represented in FIG. 5.

Example 6: Use of a Kit According to the Disclosure for a Treatment for Priming Lettuce Grains, Comprising Agents a) and c)

The imbibition medium is an aqueous solution of the following germination activators a) 0.5-5 mM $KNO_3$+0.1-5 mM $MgSO_4$+0.1-5 mM $NH_4SO_4$+0.1-5 mM $KH_2PO_4$, and of the following cellular oxidative mechanism regulators c) 1-50 mM ASA+1-5 mM GSH.

The germination kinetics of lettuce seeds untreated (black) and treated according to the disclosure (grey) are represented in FIG. 6.

Example 7: Use of a Kit According to the Disclosure for a Treatment for Priming Tomato Grains, Comprising Agents a) and c)

The imbibition medium is an aqueous solution of the following germination activators a) 0.5-5 mM $KNO_3$+0.1-5 mM $MgSO_4$+0.1-5 mM $NH_4SO_4$+0.1-5 mM $KH_2PO_4$, and of the following cellular oxidative mechanism regulators c) 1-50 mM ASA+1-5 mM GSH+1-20 mM Pro.

The germination kinetics of tomato seeds treated by hydro-priming (grey) and treated by smart priming according to the disclosure (black) are represented in FIG. 7.

After 18 months of storage, the performance of the germination of the grains having been subjected to a priming treatment according to the disclosure is observed in comparison with that of grains having been treated by hydro-priming.

Example 8: Use of a Kit According to the Disclosure for a Treatment for Priming Lettuce Grains, Comprising Agents a), b) and c)

The imbibition medium is an aqueous solution of the following germination activators a) 0.5-5 mM $KNO_3$+0.5-5 mM $Ca(NO_3)_2$+0.1-5 mM $MgSO_4$+0.1-5 mM $NH_4SO_4$+0.1-5 mM $KH_2PO_4$, of the following agent capable of providing protection to the seeds or the plants resulting therefrom b) 0.1-5 mM SA, and of the following cellular oxidative mechanism regulators c) 1-50 mM ASA+1-5 mM GSH.

The germinative capacities 7 days after the germination of lettuce seeds treated by hydro-priming (grey) and treated by smart priming according to the disclosure (black) are represented in FIG. 8. The germinative capacities correspond to those of grains treated by hydro-priming and treated by smart priming according to the disclosure and having undergone a controlled deterioration protocol. The results present the germinative capacities of seeds deteriorated for 0 days (t0), 2 days (t2), 3 days (t3) or 6 days (t6).

After protocol of controlled deterioration of the seeds, the performance of the grains having been subjected to a priming treatment according to the disclosure is observed in comparison with that of grains having been treated by hydro-priming.

The invention claimed is:

1. A kit for preparing an imbibition medium in a treatment for priming seeds, comprising and configured for a combined application of (a) and (c), wherein (a) and (c) are:
   (a) (1) nitrates, (2) sulfates, (3) phosphates, (4) gibberellins, and (5) sodium nitroprusside, wherein the concentration of each of (a)(1), (a)(2), (a)(3), (a)(4) and (a)(5) in the imbibition medium is 0.001-10 mM, and
   (c) proline, ascorbic acid and/or its salts, and reduced glutathione.

2. The kit according to claim 1, further comprising:
   (b) one or more agents capable of providing protection to said seeds and/or the plants resulting therefrom, the concentration of each of said agents in the imbibition medium being 0.1-10 mM.

3. The kit according to claim 1, wherein the concentration of each of (a)(1), (a)(2), (a)(3), (a)(4) and (a)(5) in the imbibition medium is 0.01-10 mM.

4. The kit according to claim 1, further comprising nitrites, ethylene, precursors of ethylene, ammonium salts, or mixtures thereof.

5. The kit according to claim 1, wherein (a) is potassium nitrate at a concentration in the imbibition medium of 0.1-10 mM, calcium nitrate at a concentration in the imbibition medium of 0.1-10 mM, magnesium sulfate at a concentration in the imbibition medium of 0.1-10 mM, monobasic potassium phosphate at a concentration in the imbibition medium of 0.1-10 mM, potassium hydrogen phosphate at a concentration in the imbibition medium of 0.1-10 mM, gibberellic acid at a concentration in the imbibition medium of 0.01-1 mM and sodium nitroprusside at a concentration in the imbibition medium of 0.01-1 mM.

6. The kit according to claim 2, wherein the agent(s) (b) is/are chosen from the stimulators of the natural defenses of the seeds and the stimulators of the natural defenses of the plants resulting from said seeds, in response to a biotic stress and/or an abiotic stress.

7. The kit according to claim 6, wherein the stimulators of the natural defenses of the seeds are chosen from molecules of the salicylate family at a concentration in the imbibition medium of 0.05-3 mM, derivatives of salicylic acid, and acibenzolar-S-methyl.

8. The kit according to claim 7, wherein the derivatives of salicylic acid are chosen from sulfosalicylic acid and methyl salicylate, and are in a concentration in the imbibition medium of 0.1-5 mM.

9. The kit according to claim 1, wherein the proline is in a concentration in the imbibition medium of 0.1-30 mM.

10. The kit according to claim 1, wherein the ascorbic acid and its salts is in a concentration in the imbibition medium of 0.05-150 mM.

11. A kit as defined in claim 1, configured for treatment of seeds intended to be stored before being sown.

12. The kit according to claim 1, wherein the reduced glutathione is in a concentration in the imbibition medium of 0.01-5 mM.

13. A method for treatment of seeds comprising the following steps:
   imbibing the seeds in an imbibition medium obtained from a kit according to any one of claim 1-3, 4, 5-8, 9-10, or 11-12, and then
   dehydrating the imbibed seeds.

14. The method according claim 13, wherein the seeds are imbibed by impregnation or spraying with said imbibition medium.

15. The method according to claim 13, wherein the seeds are chosen from seeds of cultivated or cultivable plant species.

16. The method according to claim 15, wherein the seeds are chosen from vegetable seeds, aromatic seeds, floral seeds and field seeds.

* * * * *